No. 818,936. PATENTED APR. 24, 1906.
J. D. BUCKLEY.
SEED DROPPER.
APPLICATION FILED DEC. 4, 1905.

2 SHEETS—SHEET 1.

Witnesses
G. R. Thomas
F. C. Jones

Inventor
John D. Buckley
By Chandler Chandler
Attorneys

No. 818,936. PATENTED APR. 24, 1906.
J. D. BUCKLEY.
SEED DROPPER.
APPLICATION FILED DEC. 4, 1905.
2 SHEETS—SHEET 2.
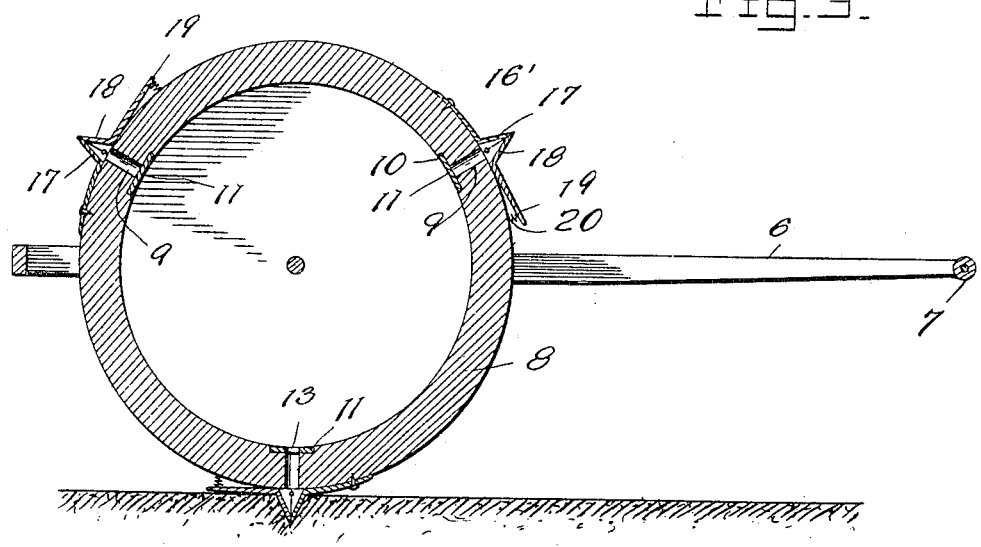
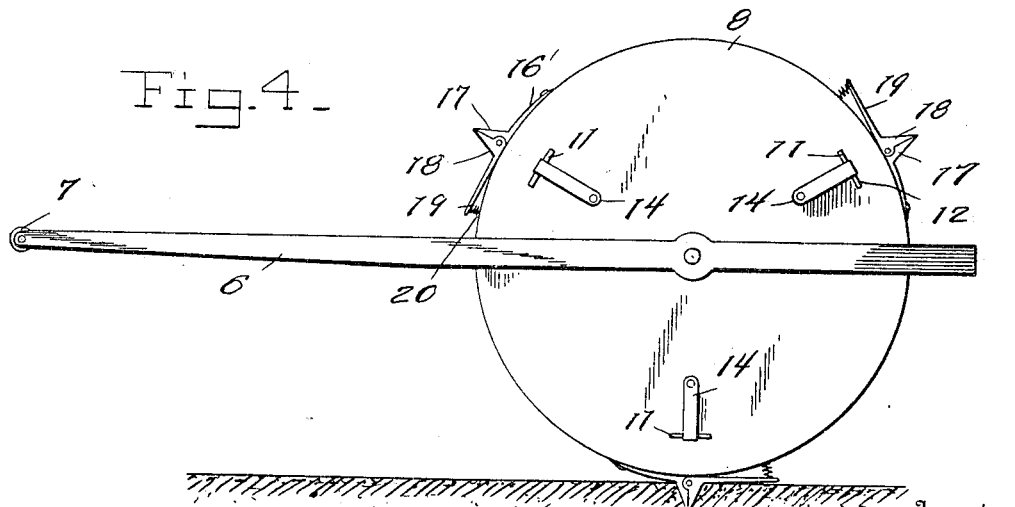
Witnesses
G. R. Thomas
J. C. Jones
Inventor
John D. Buckley
By Chandler & Chandler
Attorneys

UNITED STATES PATENT OFFICE.

JOHN DAVID BUCKLEY, OF FERMOY, PENNSYLVANIA.

SEED-DROPPER.

No. 818,936.          Specification of Letters Patent.          Patented April 24, 1906.

Application filed December 4, 1905. Serial No. 290,320.

*To all whom it may concern:*

Be it known that I, JOHN DAVID BUCKLEY, a citizen of the United States, residing at Fermoy, in the county of Wayne, State of Pennsylvania, have invented certain new and useful Improvements in Seed-Droppers; and I do hereby declare the following to be a full, clear, and exact description of the invention, such as will enable others skilled in the art to which it appertains to make and use the same.

This invention relates to planters, and more particularly to those known as "seed-droppers," and has for its object to provide an implement of this kind which will be arranged to form an opening in the ground and to drop a certain number of seeds therein, the implement being constructed for automatic operation.

Other objects and advantages will be apparent from the following description.

Figure 1:
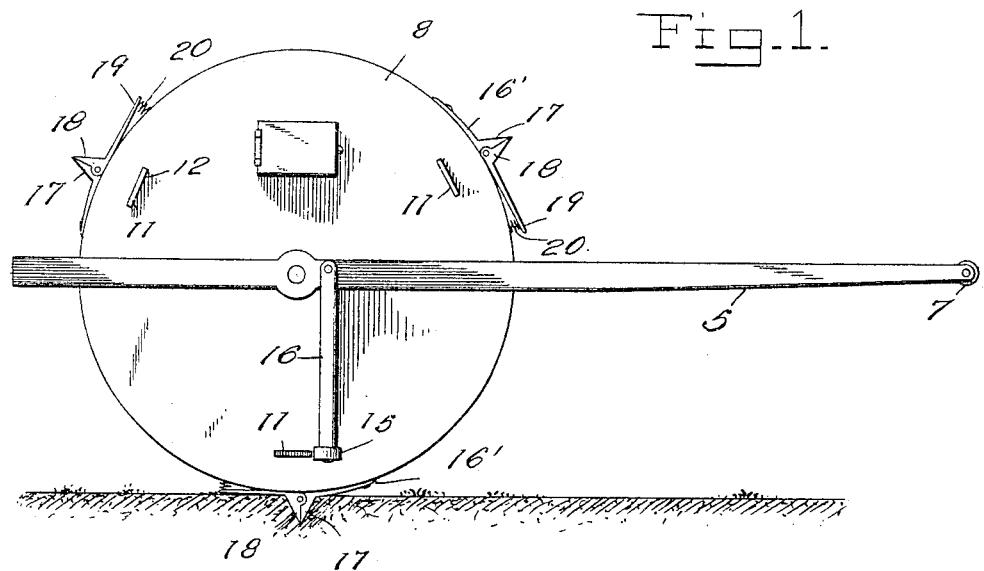
Figures 2, 5:
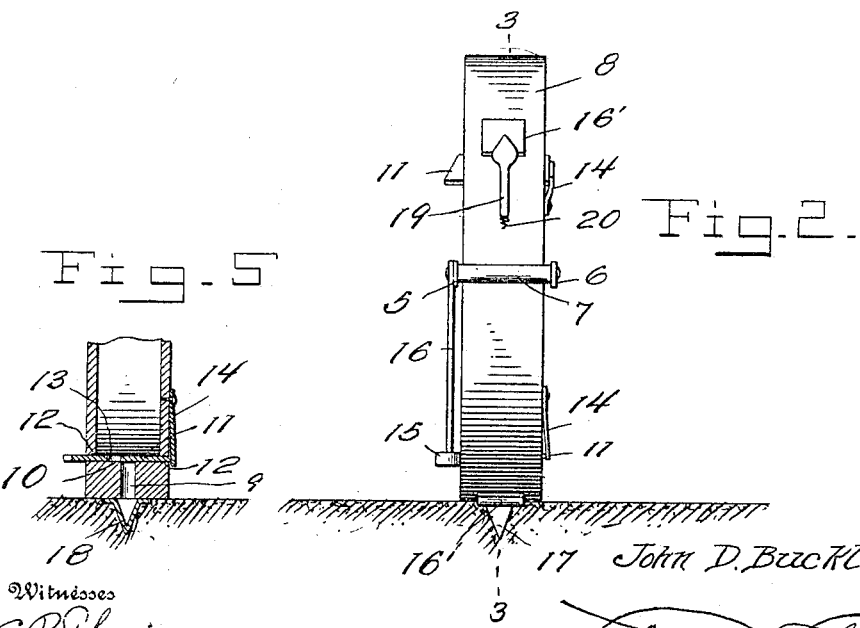

In the drawings forming a portion of this specification, and in which like numerals of reference indicate similar parts in the several views, Figure 1 is a view of one side of the dropper. Fig. 2 is a rear elevation. Fig. 3 is a central vertical section on the line 3 3 of Fig. 2. Fig. 4 is a view of the opposite side from that shown in Fig. 1; and Fig. 5 is a detail section of the slide and passages, taken at right angles to Fig. 3.

Referring now to the drawings, the present invention comprises a frame including spaced parallel sills 5 and 6, which extend horizontally and which have a hand-grip 7 at their rearward ends. A hollow cylindrical receptacle 8 is journaled vertically between the sills, at the forward portions thereof, and formed in the receptacle there are a plurality of radial passages 9, communicating with the interior thereof and opening through its periphery. At their inner ends these passages are enlarged transversely of the receptacle, as shown at 10, and in these enlargements there are mounted slides 11, which are movable longitudinally thereof in guide-openings 12, which communicate with the enlargements and which open through the side faces of the receptacle. These openings 12 and the enlargements thus are in reality transverse passages through the receptacle, and at their ends the slides project outwardly beyond the receptacle. The slides have openings 13 formed therethrough and are movable to bring these openings into and out of registration with the unenlarged lower portions of the passages 9, and springs 14 are secured at one end to the receptacle and at their other ends to the slides, these springs being arranged to hold the slides with their openings out of registration with the passages and with the opposite ends of the slides projected beyond the receptacle and into the vertical plane of a roller 15, journaled upon a depending rod 16, which is carried by a sill 5. It will thus be apparent that as the receptacle 8 is revolved the slides 11 will be brought into engagement with the roller 15 and will be moved inwardly against the action of the springs 14 to register their openings with the outer portions of the passages, and the roller is so disposed that this movement occurs just before the passages reach the lowermost points of their movement. The seed to be dropped is disposed within the receptacle 8, and it will be apparent that during the time that the openings are in registration with the passages a certain quantity of the seed will pass downwardly through the latter.

A plate 16′ is secured at one side of each of the passages 9 against the outer periphery of the receptacle, and these plates lie rearwardly of the passages when the latter are at their lowest points of movement. A radially-extending jaw 17 is carried by the end of the plate 16′ adjacent to the passage and has pivoted thereto at its inner portion a similar jaw 18, movable into and out of coöperative relation to the jaw 17 to close the passage, it being understood that each passage is provided with a pair of these jaws. The jaws 17 and 18 are tapered outwardly, so that they form a cone or bill when they are in operative position, and the jaw 18 has a finger 19 extending therefrom oppositely to the plate 16′ and having a helical spring 20 disposed between its outer end and the periphery of the receptacle, this spring being thus arranged to hold the jaws in coöperative relation and in position to close the passage. It will thus be seen that as the implement is moved forwardly over the ground the passages 9 will be brought successively to the lower portion thereof and that, as described above, the slides 11 will be operated to admit seed to these passages, the seed being kept from passing immediately therefrom by the jaws 17 and 18. Rotation of the receptacle also forces the jaws 17 and 18 into the ground, and further rotation thereof moves the finger 19 against the action of the spring 20 to separate the jaws and permit the passage of the seed into the hole formed thereby, it being understood that the finger 20 engages the ground and that the weight of the receptacle is sufficient to compress the spring 20, thus separating the jaws.

What is claimed is—

1. In an implement of the class described, the combination with a hollow revoluble member adapted for the reception of seed and having a seed-outlet passage opening through its periphery, of a closure for the outer end of the passage arranged for pivotal movement into and out of operative position, a finger connected with the closure for movement of the latter upon its pivot when the finger is moved, and means for holding the finger yieldably with the closure in operative position, said finger being adapted for engagement with the ground when the member is moved thereover to move the finger against the action of the holding means.

2. In an implement of the class described, the combination with a revoluble seed-receptacle adapted for movement over the ground and having a seed-outlet passage opening through its outer surface, of a closure for the outer end of the passage, said closure being adapted to enter the ground to form an opening therein as the seed-receptacle is revolved, said closure being movable into and out of operative position, means for holding the closure in operative position, and means for automatically moving the closure into inoperative position after it has entered the ground.

3. In an implement of the class described, the combination with a revoluble seed-receptacle having a seed-outlet passage opening through its outer surface, of a closure for the inner end of the passage arranged for movement into and out of operative position, means for holding said closure in inoperative position, means for moving the closure out of operative position as the receptacle is revolved, a closure for the outer end of the passage, means for holding the second-named closure yieldably in operative position, and means for moving the second-named closure out of operative position as the receptacle is revolved.

4. In an implement of the class described, the combination with a revoluble seed-receptacle having a seed-outlet passage opening through its outer surface, of jaws located at the outer end of the passage and movable into and out of position to close the latter, said jaws extending outwardly from the seed-receptacle, a finger carried by one of the jaws and extending circumferentially of the receptacle, and a spring engaged between the finger and the receptacle to hold them yieldably in spaced relation and with the jaws in operative position, said finger being movable against the action of the spring to bring the jaws into inoperative position.

5. An implement of the class described comprising sills, a hollow receptacle journaled vertically between the sills, said receptacle having a transverse passage formed therethrough and extending into its inner surface and having a radial passage communicating with said transverse passage and opening through the outer periphery of the receptacle, a slide having an opening therethrough disposed in the transverse passage for movement longitudinally thereof into and out of position to register its opening with the radial passage, a spring secured to one end of the slide and to the receptacle to hold the slide yieldably with its opening out of registration with the radial passage, and a roller connected with one of the sills and disposed for engagement of the opposite end of the slide when the receptacle is revolved to move the slide against the action of the spring.

In testimony whereof I affix my signature in presence of two witnesses.

JOHN DAVID BUCKLEY.

Witnesses:
F. H. CRAGO,
O. L. ROWLAND.